United States Patent
Takamatsu et al.

(10) Patent No.: US 9,397,589 B2
(45) Date of Patent: Jul. 19, 2016

(54) TRANSDUCER INCLUDING AN ELASTOMER

(71) Applicant: TOKAI RUBBER INDUSTRIES, LTD., Aichi-ken (JP)

(72) Inventors: Shigeaki Takamatsu, Aichi-ken (JP); Shinji Kumagai, Aichi-ken (JP); Yota Kokubo, Kyoto-fu (JP)

(73) Assignee: SUMITOMO RIKO COMPANY LIMITED, Aichi (JP)

( * ) Notice: Subject to any disclaimer, the term of this patent is extended or adjusted under 35 U.S.C. 154(b) by 500 days.

(21) Appl. No.: 13/934,965

(22) Filed: Jul. 3, 2013

(65) Prior Publication Data

US 2013/0293063 A1 Nov. 7, 2013

Related U.S. Application Data

(63) Continuation of application No. PCT/JP2012/072489, filed on Sep. 4, 2012.

(30) Foreign Application Priority Data

Oct. 11, 2011 (JP) .................................. 2011-223959
Mar. 23, 2012 (JP) .................................. 2012-066985

(51) Int. Cl.
  *H02N 1/00* (2006.01)
  *H02N 11/00* (2006.01)

(52) U.S. Cl.
  CPC ............. *H02N 11/006* (2013.01); *H02N 1/004* (2013.01)

(58) Field of Classification Search
  CPC ........... H02N 1/00–1/12; H02N 11/00–11/008
  USPC .................................................. 310/300, 309
  See application file for complete search history.

(56) References Cited

U.S. PATENT DOCUMENTS 6,812,624 B1 11/2004 Pei et al.
8,029,654 B2 10/2011 Takagi et al.
(Continued)

FOREIGN PATENT DOCUMENTS

JP         07107763 A   *  4/1995
JP       2001-524278       11/2001
(Continued)

OTHER PUBLICATIONS

Machine Translation, Takamatsu et al., JP 2011201104 A, Oct. 13, 2011.*

(Continued)

*Primary Examiner* — Thomas Truong
(74) *Attorney, Agent, or Firm* — Greenblum & Bernstein, P.L.C.

(57) ABSTRACT

A transducer includes a high-resistance layer that includes an elastomer and has a volume resistivity of $10^{12}$ Ω·cm or more, a pair of electrodes that are arranged on both a front side and a back side of the high-resistance layer and include a binder and a conductive material, and a medium-resistance layer that is interposed between the electrode and the high-resistance layer on at least one of the front side and the back side of the high-resistance layer, includes an elastomer, and has a volume resistivity that is smaller than the volume resistivity of the high-resistance layer by two or more digits. In the transducer, the medium-resistance layer is interposed between at least one electrode and the high-resistance layer to take advantage of the resistance to dielectric breakdown originally possessed by the high-resistance layer, thereby obtaining a larger force by applying a higher voltage.

10 Claims, 8 Drawing Sheets

(56) References Cited

U.S. PATENT DOCUMENTS

| | | | |
|---|---|---|---|
| 2007/0116858 A1* | 5/2007 | Benslimane | B81B 3/0021 427/58 |
| 2010/0171393 A1 | 7/2010 | Pei et al. | |
| 2011/0049404 A1 | 3/2011 | Suda | |
| 2011/0300393 A1 | 12/2011 | Iio et al. | |
| 2013/0307370 A1* | 11/2013 | Jenninger | H01L 41/113 310/300 |

FOREIGN PATENT DOCUMENTS

| | | |
|---|---|---|
| JP | 2003-506858 | 2/2003 |
| JP | 2005-51949 | 2/2005 |
| JP | 2011-72112 | 4/2011 |
| JP | 2011-72174 | 4/2011 |
| JP | 2011-201104 | 10/2011 |
| WO | 98/35529 | 8/1998 |
| WO | 01/06579 | 1/2001 |

OTHER PUBLICATIONS

U.S. Appl. No. 13/934,853 to Shigeaki Takamatsu et al., filed Jul. 3, 2013.
International Search Report, mail date is Nov. 20, 2013.
International Search Report, mail date is Nov. 20, 2012.
International Preliminary Report on Patentability and English language translation for PCT/JP2012/072489, mailed Apr. 15, 2014.
Search report from E.P.O., mail date is Feb. 18, 2015.

* cited by examiner

//TRANSDUCER INCLUDING AN ELASTOMER

CLAIM FOR PRIORITY

This application is a continuation of PCT/JP2012/072489 filed Sep. 4, 2012, and claims the priority benefit of Japanese Applications No. 2011-223959, filed Oct. 11, 2011, and No. 2012-066985, filed Mar. 23, 2012, the contents of which are expressly incorporated by reference in their entirety.

TECHNICAL FIELD

The present invention relates to a flexible transducer using an elastomer material.

BACKGROUND ART

Transducers, such as actuators and sensors that perform conversion between mechanical energy and electric energy and speakers and microphones that perform conversion between acoustic energy and electric energy are known. In order to form a highly flexible, compact, and lightweight transducer, polymer materials such as dielectric elastomers are useful.

For example, a flexible actuator can be formed by arranging, on both sides in the thickness direction of a sheet-shaped dielectric layer formed of a dielectric elastomer, a pair of electrodes whose electric resistance does not easily increase even when the electrodes expand and contract. In actuators of this kind, when a voltage applied between the electrodes increases, an electrostatic attraction between the electrodes increases. The dielectric layer interposed between the electrodes is thereby compressed in the thickness direction, leading to a reduced thickness of the dielectric layer. When the film thickness decreases, the dielectric layer accordingly expands in a direction parallel to the electrode surfaces. On the other hand, when the voltage applied between the electrodes is reduced, the electrostatic attraction between the electrodes decreases. A compressive force against the dielectric layer in the thickness direction thereby decreases, and the film thickness increases due to the elastic restoring force of the dielectric layer. When the film thickness increases, the dielectric layer accordingly contracts in a direction parallel to the electrode surfaces. The actuator thus expands and contracts the dielectric layer, thereby driving a member to be driven.

A force and a displacement output from the actuator are determined by the magnitude of the applied voltage and the dielectric constant of the dielectric layer. In other words, the larger the applied voltage and the dielectric constant of the dielectric layer, the larger the generative force and displacement of the actuator. For this reason, materials for use in the dielectric layer include silicone rubber, which has high resistance to dielectric breakdown, and acrylic rubber, nitrile rubber, or the like, each having a high dielectric constant (see, for example, Patent Documents 1 and 2).

RELATED ART DOCUMENTS

Patent Documents

Patent Document 1: Publication of Japanese Translation of PCT Application No. 2003-506858
Patent Document 2: Publication of Japanese Translation of PCT Application No. 2001-524278
Patent Document 3: Japanese Patent Application Publication No. 2011-201104
Patent Document 4: Japanese Patent Application Publication No. 2005-51949

SUMMARY OF THE INVENTION

Problem to be Solved by the Invention

However, the dielectric constant of silicone rubber is low. Thus, when silicone rubber is used for the material of the dielectric layer, the electrostatic attraction with respect to the applied voltage is low, which makes it difficult to obtain a desired generative force and displacement. Silicone rubber does not have sufficient resistance to dielectric breakdown, so an applicable voltage is limited.

On the other hand, the dielectric constant of acrylic rubber and nitrile rubber is higher than that of silicone rubber. Thus, when acrylic rubber or the like is used for the material of the dielectric layer, the electrostatic attraction with respect to the applied voltage increases, compared to a case where silicone rubber is used. However, the electric resistance of acrylic rubber or the like is lower than that of silicone rubber. Therefore, the dielectric layer is more susceptible to dielectric breakdown. Because a current passes through the dielectric layer during voltage application (so-called leakage current), electric charges are not prone to accumulate in the vicinity of the interface between the dielectric layer and the electrodes. Despite its high dielectric constant, therefore, the electrostatic attraction decreases, which makes it difficult to obtain a desired generative force and displacement. Furthermore, there is a risk that when a current passes through the dielectric layer, the dielectric layer may be broken due to generated Joule's heat. Under the present circumstances, as described above, there is no elastomer that can withstand high electric field intensity. Therefore, when elastomers are used for the material of the dielectric layer, it is hard to achieve an actuator having a high generative force and displacement by increasing the applied voltage.

The present invention has been achieved in view of the above circumstances, and an object thereof is to provide a transducer that includes a dielectric layer having an elastomer and can output a large force through the application of a high voltage.

Means for Solving the Problem

The dielectric breakdown strength of an elastomer can be measured using, for example, a Mckeown electrode. The Mckeown electrode is formed by holding a sample between a pair of stainless steel ball electrodes and fixing the sample and the electrodes with epoxy resin. On the other hand, in the above flexible actuator, flexible electrodes are arranged so as to cover both the front side and the back side of a dielectric layer. The flexible electrodes are, as described in e.g., Patent Document 3, formed by dispersing a conductive material in an elastomer. A study by the inventors of the present invention has proved that when an actuator is formed, dielectric breakdown occurs in a dielectric layer at a voltage lower than a dielectric breakdown voltage measured using the Mckeown electrode. The reasons for this can be considered as follows.

In the measuring method using the Mckeown electrode, two spherical electrodes, each with a diameter of 10 mm, are arranged with an elastomer (sample) held therebetween. In this case, the electrode and the elastomer come into contact with each other at one point. The elastomer is only provided with a conduction path between the contact points with the electrodes. In the actuator, the electrodes are arranged so as to cover both the front side and the back side of the elastomer (dielectric layer). The electrodes exhibit electric conductivity by the electronic conduction of the dispersed conductive material. Microscopically, the elastomer is supplied with electric charges through a large number of points on the conductive material. A voltage is therefore hard to be uniformly applied to the interface of the elastomer being in contact with the electrode. When there are some defects in the elastomer, concentration of electric charges on any defective part causes a large current to pass so that the dielectric layer is more likely to be broken. The measuring method using the Mckeown electrode and the actual actuator thus differ in electrode structure. It is therefore considered that when an actuator is formed, the dielectric breakdown strength of the elastomer becomes smaller than that measured using the Mckeown electrode.

The transducer achieved according to the present invention based on the above findings includes a high-resistance layer that includes an elastomer and has a volume resistivity of $10^{12}$ Ω·cm or more, a pair of electrodes that are arranged on both the front side and the back side of the high-resistance layer and include a binder and a conductive material, and a medium-resistance layer that is interposed between one of the electrodes and the high-resistance layer on at least one of the front side and the back side of the high-resistance layer, includes an elastomer, and has a volume resistivity that is smaller than that of the high-resistance layer by two or more digits.

In the transducer according to the present invention, the high-resistance layer and medium-resistance layer having different volume resistivities are interposed between the pair of electrodes. The medium-resistance layer is arranged at least on one of the front side and the back side of the high-resistance layer. In other words, the medium-resistance layer is stacked on either one of the front side and the back side of the high-resistance layer or stacked on both the front side and the back side so as to sandwich the high-resistance layer. The medium-resistance layer is interposed between the electrode and the high-resistance layer, and thus electric charges that are supplied from the electrode through a large number of points are made uniform in the medium-resistance layer and then supplied to the high-resistance layer. A voltage can be thereby applied to the high-resistance layer uniformly. This facilitates the high-resistance layer to exhibit its original resistance to dielectric breakdown. In other words, the dielectric breakdown strength of the high-resistance layer in the transducer becomes nearly the same as the result measured using the Mckeown electrode.

FIG. 1 illustrates a schematic sectional view of a first embodiment of a transducer according to the present invention. As illustrated in FIG. 1, the transducer 1 includes a high-resistance layer 10, a medium-resistance layer 20, and a pair of electrodes 30a, 30b. Now, assuming a voltage applied between the pair of electrodes 30a, 30b is V, a current passing between the pair of electrodes 30a, 30b is I, the volume resistivity of the high-resistance layer 10 is R1, the thickness of the high-resistance layer 10 is t1, a voltage applied to the high-resistance layer 10 is V1, the volume resistivity of the medium-resistance layer is R2, the thickness of the medium-resistance layer is t2, and a voltage applied to the medium-resistance layer is V2, the voltage V1 applied to the high-resistance layer 10 is calculated by Formula (1).

(Formula (1))

$$V1 + I \times R1 = \frac{V}{R1 + R2} \times R1 = \frac{V}{1 + \frac{R2}{R1}} \quad (1)$$

The volume resistivity R2 of the medium-resistance layer 20 is smaller than the volume resistivity R1 of the high-resistance layer 10 by two or more digits. In other words, in Formula (1), R2/R1 is 1/100 or less. For example, when R2/R1 is 0.01, V1=V/1.01 according to Formula (1), thereby allowing 99% of the voltage V applied between the pair of electrodes 30a, 30b to be applied to the high-resistance layer 10. When the volume resistivity R2 of the medium-resistance layer 20 is smaller than the volume resistivity R1 of the high-resistance layer 10 by two or more digits, 99% or more of the voltage V applied between the pair of electrodes 30a, 30b is applied to the high-resistance layer 10.

Here, an embodiment in which the medium-resistance layer is arranged on only one side of the high-resistance layer has been described. However, also in an embodiment in which the medium-resistance layer is arranged on both sides (both the front side and the back side) of the high-resistance layer, the voltage applied to the high-resistance layer is similarly calculated by Formula (1).

The transducer according to the present invention has a volume resistivity of the high-resistance layer of $10^{12}$ Ω·cm or more. The high-resistance layer is therefore excellent in resistance to dielectric breakdown. Thus, by interposing the medium-resistance layer between the electrode and the high-resistance layer to take advantage of the resistance to dielectric breakdown inherently possessed by the high-resistance layer, a larger force can be obtained by applying a higher voltage.

DESCRIPTION OF THE REFERENCE NUMERALS

Figure 1:
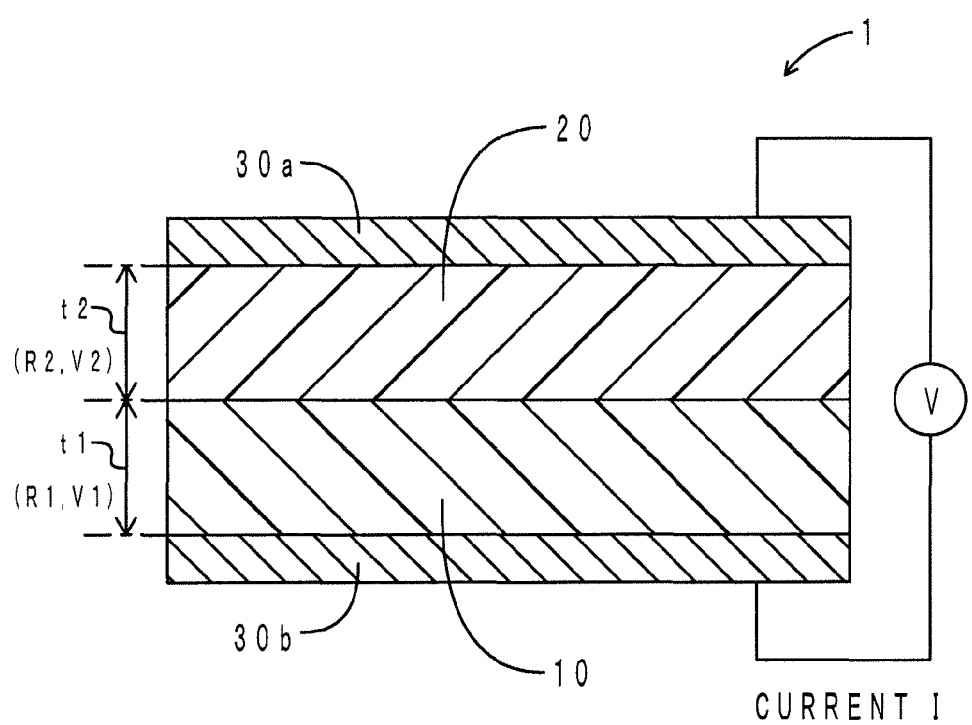
FIG. 1 is a schematic sectional view of a transducer according to a first embodiment.

1: Transducer, 10: High-resistance layer, 20, 21, 22: Medium-resistance layers, 23: Cation-immobilized layer (Medium-resistance layer), 24: Anion-immobilized layer (Medium-resistance layer), 30a, 30b: Electrode, 31: Positive electrode, 32: Negative electrode, 230: Elastomer, 231: Cation-immobilized particle, 232: Anionic component, 240: Elastomer, 241: Anion-immobilized particle, 242: Cationic component.

5: Actuator, 50: Stacked body, 51a, 51b: Electrode, 52: Upper chuck, 53: Lower chuck.

MODES FOR CARRYING OUT THE INVENTION

Embodiments of a transducer according to the present invention will be described. The transducer according to the present invention is not limited to the embodiments below and may be embodied in various ways in which modifications and improvements that could be performed by those skilled in the art are made without departing from the scope of the present invention. The transducer according to the present invention includes a high-resistance layer, a medium-resistance layer, and a pair of electrodes.

<High-Resistance Layer>

The high-resistance layer includes an elastomer and has a volume resistivity of $10^{12}$ Ω·cm or more. The high-resistance layer may be formed of only the elastomer or may be formed of the elastomer with other components added. In the present specification, the elastomer includes cross-linked rubber and a thermoplastic elastomer.

Preferred examples of the elastomer include ethylene-propylene-diene copolymer (EPDM), isoprene rubber, natural rubber, fluorocarbon rubber, nitrile rubber (NBR), hydrogenated nitrile rubber (H-NBR), silicone rubber, urethane rubber, acrylic rubber, butyl rubber, styrene-butadiene rubber, ethylene-vinyl acetate copolymer, and ethylene-vinyl acetate-acrylate ester copolymer. A modified elastomer obtained by, for example, introducing functional groups such as epoxidized natural rubber and carboxy group-modified hydrogenated nitrile rubber (XH-NBR) may also be used. As the elastomer, these may be used singly or in combination of two or more thereof.

Examples of the other components that are blended in addition to the elastomer include an inorganic filler having high insulating properties. Blending of an insulating material can increase the volume resistivity of the high-resistance layer. Examples of the inorganic filler include silica, titanium oxide, barium titanate, calcium carbonate, clay, calcined clay, and talc. These may be used singly or in combination of two or more thereof. For example, silica is preferable for the reason that it has a larger number of functional groups, which will be described later, and it is relatively inexpensive. Also, silica, titanium oxide, and barium titanate manufactured by the hydrolytic reaction of an organometallic compound (the sol-gel process) may be used.

In order to interrupt the flow of electrons to increase insulating properties, the elastomer and the inorganic filler are preferably chemically bonded to each other. In order to do so, both the elastomer and the inorganic filler preferably have functional groups that can react with each other. Examples of such functional groups include a hydroxy group (—OH), a carboxy group (—COOH), and a maleic anhydride group. In this case, the elastomer is preferably an elastomer modified by, for example, introducing functional groups, such as carboxy group-modified hydrogenated nitrile rubber. For the inorganic filler, depending on the manufacturing method thereof, or by performing surface treatment thereon after being manufactured, functional groups can be introduced, or the number of functional groups can be increased. The more the number of functional groups, the more the reactivity of the elastomer and the inorganic filler increases.

The blend ratio of the inorganic filler may be determined with consideration given to the volume resistivity or the like of the elastomer. For example, it is preferably 5 parts by mass or more and 50 parts by mass or less with respect to 100 parts by mass of the elastomer. Being less than 5 parts by mass is ineffective in increasing electric resistance. In contrast, exceeding 50 parts by mass may harden the high-resistance layer, which may impair flexibility.

The thickness of the high-resistance layer is preferably 5 μm or more in view of ensuring the film forming accuracy and reducing film defects. When the thickness of the high-resistance layer increases, a higher voltage is required for driving, leading to an increase in cost. For this reason, the thickness of the high-resistance layer is preferably 50 μm or less. The intensity of the electric field applied to the high-resistance layer is calculated by dividing the voltage V1 applied to the high-resistance layer by the thickness t1 (see FIG. 1). Therefore, as the thickness of the high-resistance layer is decreased, the electric field intensity can be increased.

The thickness ratio of the high-resistance layer with respect to the entire thickness of the high-resistance layer and the medium-resistance layer is preferably 0.1 or more and 0.75 or less ($0.1 \leq t1/(t1+t2) \leq 0.75$, see FIG. 1). When the thickness ratio of the high-resistance layer is less than 0.1, the thickness of the transducer increases because the thickness of the medium-resistance layer increases. In this case, the applied voltage is required to be increased, leading to practical inconvenience. On the other hand, in the case of the thickness ratio of the high-resistance layer exceeding 0.75, when the thickness of the high-resistance layer is reduced to about 5 μm, it is difficult to form the medium-resistance layer having a thickness smaller than that of the high-resistance layer.

<Medium-Resistance Layer>

Figure 2:
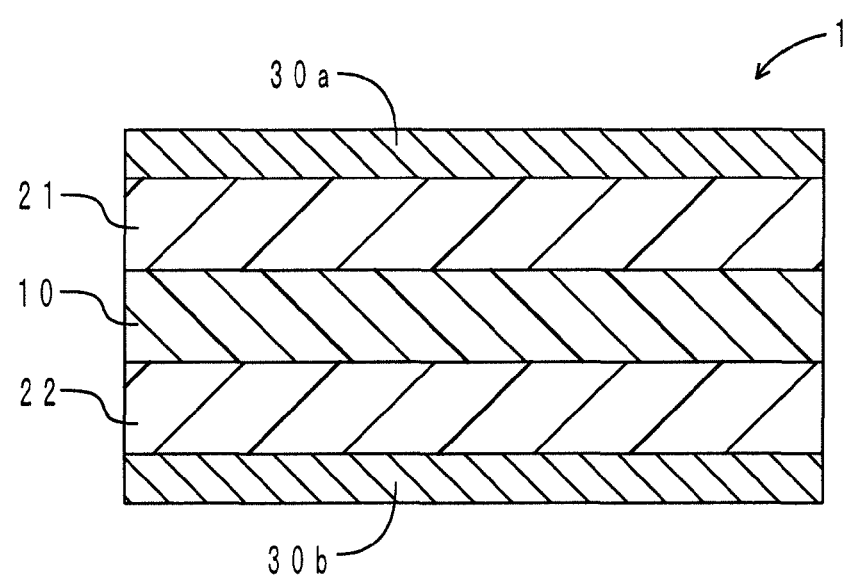
FIG. 2 is a schematic sectional view of a transducer according to a second embodiment.

The medium-resistance layer is stacked on at least one of the front side and back side of the high-resistance layer. For example, as in the above first embodiment, one high-resistance layer and one medium-resistance layer are stacked between a pair of electrodes to form a transducer. In view of uniform supply of electric charges on both the front side and the back side of the high-resistance layer, the medium-resistance layer is preferably arranged on both the front side and the back side of the high-resistance layer. FIG. 2 illustrates a schematic sectional view of a second embodiment of a transducer according to the present invention. As illustrated in FIG. 2, the transducer 1 includes the high-resistance layer 10, medium-resistance layers 21, 22, and the pair of electrodes 30a, 30b. The medium-resistance layer 21 is stacked on the upper side (front side) of the high-resistance layer 10. The electrode 30a is arranged on the upper side of the medium-resistance layer 21. In other words, the medium-resistance layer 21 is interposed between the high-resistance layer 10 and the electrode 30a. The medium-resistance layer 22 is stacked on the lower side (back side) of the high-resistance layer 10. The electrode 30b is arranged on the lower side of the medium-resistance layer 22. In other words, the medium-resistance layer 22 is interposed between the high-resistance layer 10 and the electrode 30b.

The volume resistivity of the medium-resistance layer is smaller than the volume resistivity of the high-resistance layer by two or more digits. The volume resistivity of the medium-resistance layer is preferably $10^9$ Ω·cm or more, and more preferably, $10^{10}$ Ω·cm or more.

The medium-resistance layer includes an elastomer. The elastomer may be the same as the elastomer in the high-resistance layer or may be different therefrom. When the medium-resistance layer includes ion-immobilized particles, which will be described later, an elastomer capable of being chemically bonded to the ion-immobilized particles is preferably used. For example, when the ion-immobilized particles have a hydroxy group (—OH), an elastomer having a functional group that can react with the hydroxy group may be used. Examples of such a functional group include a carboxy group (—COOH), an amino group (—NH), and an epoxy group. For example, in view of high dielectric constant, preferable examples include carboxy group-modified nitrile rubber (X-NBR) and carboxy group-modified hydrogenated nitrile rubber (XH-NBR). Among them, an elastomer having an acrylonitrile content (combined AN amount) of 33% by mass or more is preferable. The combined AN amount is the mass ratio of acrylonitrile when the entire rubber mass is 100% by mass.

In view of making a force output from the transducer larger, the medium-resistance layer preferably includes ionic components. When a voltage is applied, a large number of electric charges, caused by the polarization of the ionic components, are generated within the medium-resistance layer. A large number of electric charges are therefore accumulated within the medium-resistance layer and in the vicinity of the interface with the high-resistance layer. A large electrostatic attraction is thereby generated that compresses the high-resistance layer and the medium-resistance layer so that larger output can be obtained.

Patent Document 4 discloses an actuator in which a conductive polymer layer and an ionic electrolyte-containing layer are interposed between a pair of electrodes.

In the actuator according to Patent Document 4, a voltage is applied to dope/undope the ions of the ionic electrolyte-containing layer to/from the conductive polymer layer, thereby expanding and contracting the conductive polymer layer to generate a force. The actuator according to Patent Document 4 is different from the transducer according to the present invention in that the ions are allowed to migrate between the adjacent layers.

The ionic components may be solid or liquid (ionic liquid) at room temperature. In particular, the ionic liquid is preferable. Part of the ionic components may be immobilized to a polymer constituting the medium-resistance layer. For example, a polymer to which cations or anions are immobilized can be mixed into the elastomer. Ion-immobilized particles in which cations or anions are immobilized to metallic oxide particles may be chemically bonded to the elastomer. The latter embodiment, that is, an embodiment in which the medium-resistance layer includes the ion-immobilized particles will be described.

The medium-resistance layer according to the present embodiment includes an elastomer, ion-immobilized particles in which first ionic components are immobilized to metallic oxide particles, and second ionic components having electric charges opposite to those of the first ionic components. It is preferable that the ion-immobilized particles are chemically bonded to the elastomer and that the electric charges of the first ionic components have the same polarity as that of the adjacent electrode.

The electric charges of the first ionic components immobilized to the ion-immobilized particles has the same polarity as that of the adjacent electrode. In other words, in the medium-resistance layer interposed between the positive electrode and the high-resistance layer, the first ionic components have positive electric charges. In other words, the medium-resistance layer includes ion-immobilized particles in which cations are immobilized to the metallic oxide particles. Similarly, in the medium-resistance layer interposed between the negative electrode and the high-resistance layer, the first ionic components have negative electric charges. In other words, the medium-resistance layer includes ion-immobilized particles in which anions are immobilized to the metallic oxide particles. Hereinafter, the structure and operation of a transducer having the medium-resistance layer according to the present embodiment will be described using schematic views.

Figure 3:
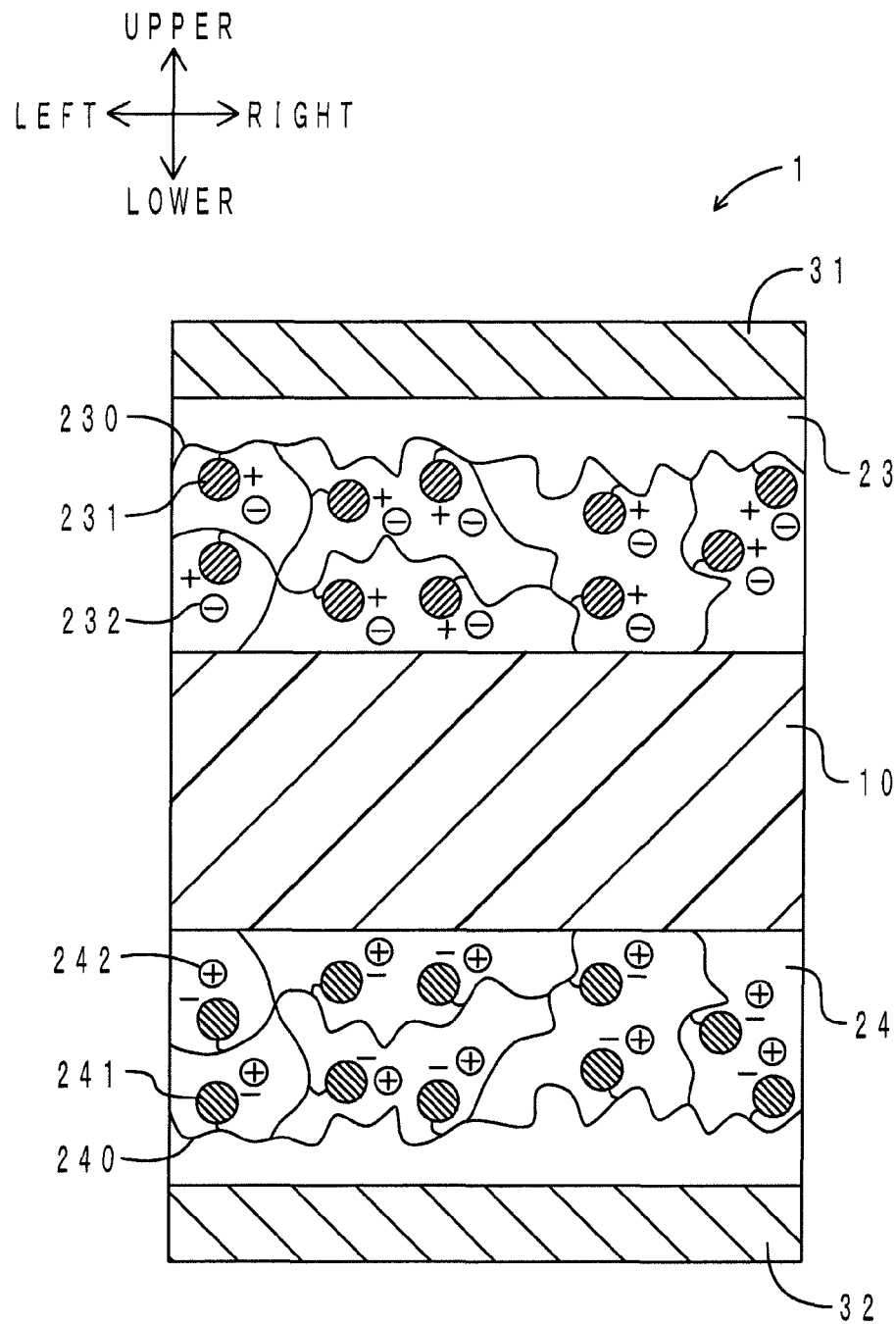
FIG. 3 is a schematic sectional view of a transducer according to a third embodiment before voltage application.
Figure 4:
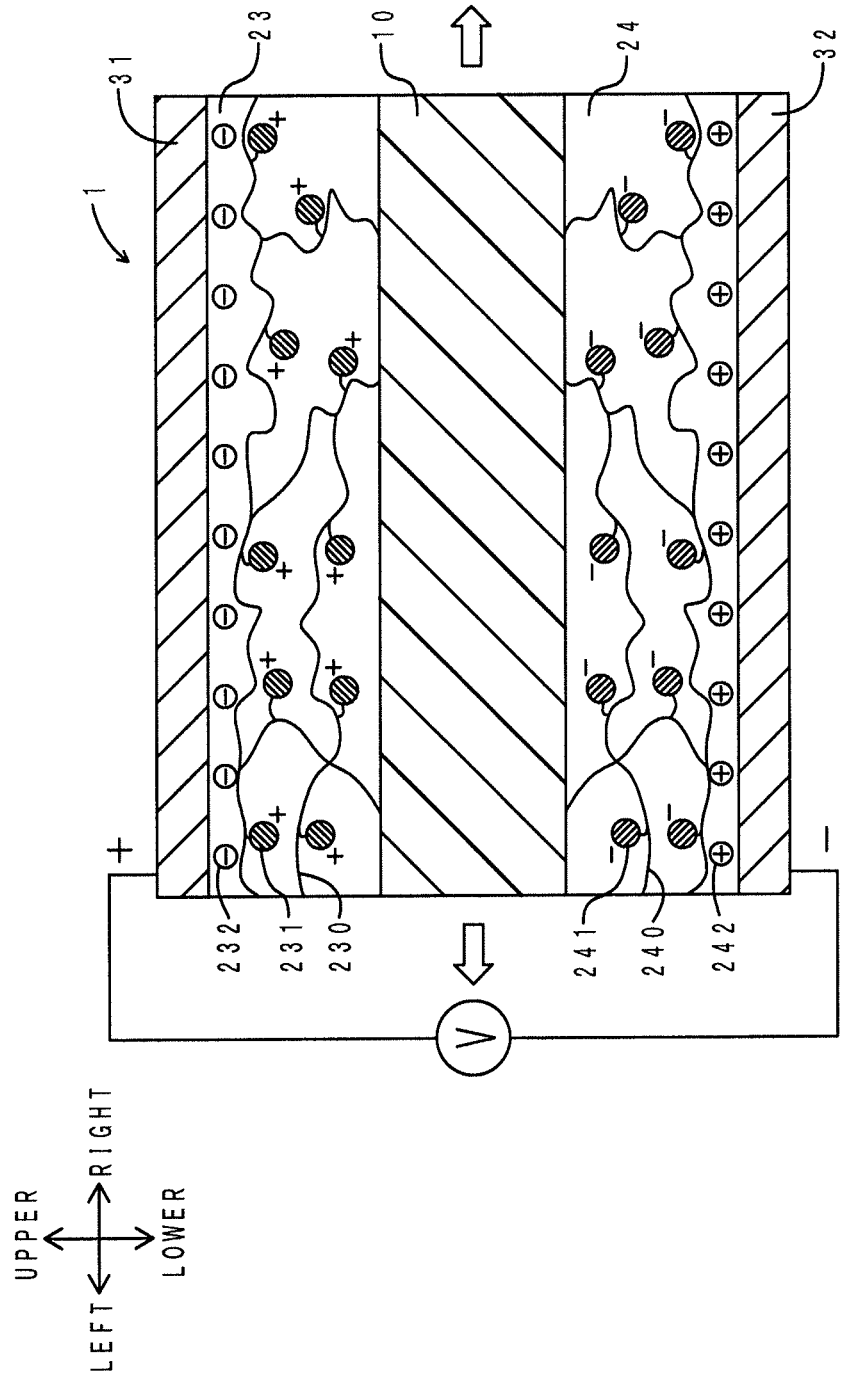
FIG. 4 is a schematic sectional view of the transducer during voltage application.

FIG. 3 illustrates a schematic sectional view of a transducer according to a third embodiment before voltage application. FIG. 4 illustrates a schematic sectional view of the transducer during voltage application. FIG. 3 and FIG. 4 illustrate the transducer according to the third embodiment schematically and do not limit the transducer according to the present invention at all.

As illustrated in FIG. 3, the transducer 1 includes the high-resistance layer 10, a cation-immobilized layer 23, an anion-immobilized layer 24, a positive electrode 31, and a negative electrode 32. The cation-immobilized layer 23 is arranged on the upper side of the high-resistance layer 10. The positive electrode 31 is arranged on the upper side of the cation-immobilized layer 23. In other words, the cation-immobilized layer 23 is interposed between the high-resistance layer 10 and the positive electrode 31. The cation-immobilized layer 23 includes an elastomer 230, cation-immobilized particles 231, and anionic components 232. The cation-immobilized particles 231 are metallic oxide particles to which cationic components are immobilized. The cation-immobilized particles 231 are chemically bonded to the elastomer 230.

Similarly, the anion-immobilized layer 24 is arranged on the lower side of the high-resistance layer 10. The negative electrode 32 is arranged on the lower side of the anion-immobilized layer 24. In other words, the anion-immobilized layer 24 is interposed between the high-resistance layer 10 and the negative electrode 32. The anion-immobilized layer 24 includes an elastomer 240, anion-immobilized particles 241, and cationic components 242. The anion-immobilized particles 241 are metallic oxide particles to which anionic components are immobilized. The anion-immobilized particles 241 are chemically bonded to the elastomer 240. The volume resistivities of the cation-immobilized layer 23 and the anion-immobilized layer 24 are smaller than the volume resistivity of the high-resistance layer 10 by two or more digits. The cation-immobilized layer 23 and the anion-immobilized layer 24 are included in the medium-resistance layer according to the present invention.

As illustrated in FIG. 4, when a voltage is applied between the positive electrode 31 and the negative electrode 32, the anionic components 232 in the cation-immobilized layer 23 migrate toward the positive electrode 31 side. Because the cation-immobilized particles 231 are bonded to the elastomer 230, the cationic components hardly migrate. Similarly, in the anion-immobilized layer 24, the cationic components 242 migrate toward the negative electrode 32 side. Because the anion-immobilized particles 241 are bonded to the elastomer 240, the anionic components hardly migrate. In the high-resistance layer 10, positive electric charges and negative electric charges are accumulated in the vicinity of the interface with the cation-immobilized layer 23 and in the vicinity of the interface with the anion-immobilized layer 24, respectively, due to polarization. In the transducer 1, thus, a large number of electric charges are accumulated in the cation-immobilized layer 23, the anion-immobilized layer 24, and respective vicinities of the interface between the high-resistance layer 10 and the cation-immobilized layer 23 and the interface between the high-resistance layer 10 and the anion-immobilized layer 24. Therefore, a large electrostatic attraction is generated from the positive electrode 31 and the negative electrode 32 so as to compress the high-resistance layer 10, the cation-immobilized layer 23, and the anion-immobilized layer 24. This allows the high-resistance layer 10, the cation-immobilized layer 23, and the anion-immobilized layer 24 to be compressed in the up and down direction and expanded accordingly in the right and left direction as illustrated by the white arrow in FIG. 4.

The electric resistance of the high-resistance layer 10 is high. Thus, the accumulated electric charges do not easily migrate within the high-resistance layer 10. Therefore, so-called leakage current is small, and Joule's heat caused by the leakage current is less prone to be generated. In the cation-immobilized layer 23, the cationic components having the same polarity as that of the adjacent positive electrode 31 are immobilized to the elastomer 230 through the metallic oxide particles. Therefore, the cationic components do not easily migrate toward the high-resistance layer 10 side (the side opposite from the positive electrode 31). Similarly, in the anion-immobilized layer 24, the anionic components having the same polarity as that of the adjacent negative electrode 32 are immobilized to the elastomer 240 through the metallic oxide particles. Therefore, the anionic components do not easily migrate toward the high-resistance layer 10 side (the side opposite from the negative electrode 32). It is thus less likely that the ionic components migrate from the cation-immobilized layer 23 and the anion-immobilized layer 24 to the high-resistance layer 10. Therefore, the electric resistance of the high-resistance layer 10 is therefore less prone to decrease. In other words, the high-resistance layer 10 is less prone to deteriorate with time, and can maintain high resistance to dielectric breakdown. In the transducer according to the third embodiment, thus, the medium-resistance layer includes the ionic components immobilized to the elastomer, so a large electrostatic attraction is generated and a generative force is increased.

In view of high insulating properties, the metallic oxide particles constituting the ion-immobilized particles preferably contain one or more elements selected from titanium, zirconium, and silicon. Examples of the metallic oxide particles include oxide particles of titanium dioxide ($TiO_2$), zirconium dioxide ($ZrO_2$), silica ($SiO_2$), and the like each in isolation, and complex particles thereof ($TiO_2/ZrO_2$, $TiO_2/SiO_2$, or the like). As will be described later, the metallic oxide particles are preferably manufactured by the hydrolytic reaction of an organometallic compound (the sol-gel process).

In view of the transparency and resistance to dielectric breakdown of the medium-resistance layer, the ion-immobilized particles are preferably dispersed in the elastomer as uniformly as possible. The particle diameter of the ion-immobilized particles is preferably as small as possible. In view of these circumstances, the median diameter of the metallic oxide particles constituting the ion-immobilized particles is preferably 5 nm or more and 100 nm or less. The median diameter is more preferably 30 nm or less, and in particular, about 10 nm to 20 nm. The particle diameter of the metallic oxide particles can be measured through observation using a transmission electron microscope (TEM). The particle diameter may also be measured by the small-angle X-ray scattering method.

When the metallic oxide particles are manufactured by the hydrolytic reaction of an organometallic compound, it is estimated that the particle diameter of the metallic oxide particles in a sol and the particle diameter of the metallic oxide particles in the medium-resistance layer become equal. The particle diameter of the metallic oxide particles in the sol may be therefore employed as the particle diameter of the metallic oxide particles in the medium-resistance layer. The particle diameter of the metallic oxide particles in the sol can be measured by using, for example, a laser diffraction/scattering particle diameter/particle size distribution measuring apparatus manufactured by Nikkiso Co., Ltd. Also, when the sol is dried, the particle diameter of the metallic oxide particles can be measured through observation using a scanning electron microscope (SEM).

The first ionic components constituting the ion-immobilized particles are the counter ions of the second ionic components. The ion-immobilized particles can be synthesized by, for example, causing a reactive ionic liquid containing the first ionic components before immobilization and the second ionic components to react with the metallic oxide particles obtained by the sol-gel method. Hereinafter, an example of a method for manufacturing ion-immobilized particles will be described.

First, an organometallic compound is chelated (a chelating process). A rapid reaction with water is suppressed by the chelation, thereby allowing metallic oxide particles having a small particle diameter to be manufactured without agglomeration. The organometallic compound may be appropriately selected from metal alkoxide compounds and metal acylate compounds depending on the type of desired metallic oxide particles. Examples of the metal alkoxide compound include tetra-n-butoxy titanium, tetra-n-butoxy zirconium, tetra-n-butoxy silane, tetra-i-propoxy titanium, tetraethoxysilane, tetrakis(2-ethylhexyloxy) titanium, and titanium butoxide dimer. Examples of the metal acylate compound include polyhydroxy titanium stearate and zirconium tributoxy monostearate.

Examples of a chelating agent include β-diketone such as acetylacetone, benzoyl acetone, and dibenzoylmethane, β-keto acid ester such as ethyl acetoacetate and ethyl benzoylacetate, triethanolamine, lactic acid, 2-ethylhexane-1,3-diol, and 1,3-hexanediol. The chelating agent is preferably the same as a solvent for dissolving a pre-crosslinked polymer of the elastomer when the medium-resistance layer is manufactured.

Subsequently, a reactive ionic liquid, a predetermined organic solvent, and water are added to the chelate compound of the organometallic compound (an ion immobilizing process). The hydrolytic reaction of the organometallic compound thereby proceeds to produce metallic oxide particles, and the produced metallic oxide particles react with first ionic components in the reactive ionic liquid, allowing the first ionic components to be immobilized to the metallic oxide particles. In the ion immobilizing process, a reaction with the reactive ionic liquid proceeds concurrently with the hydrolytic reaction of the organometallic compound. This allows the first ionic components in the reactive ionic liquid to be immobilized not only to the surfaces of the produced metallic oxide particles but also to the inside thereof. In this regard, this process is different from conventional methods in which ionic components are immobilized to only the surfaces of the particles.

The first ionic components contained in the reactive ionic liquid include a reactive group that can react with the hydroxy group (—OH) of the produced metallic oxide particles. Examples of the reactive group include an alkoxysilyl group (Si(OR)$_3$: R is an alkyl group). Examples of the reactive ionic liquid containing such first ionic components are illustrated by Formulae (2) and (3) below. In the reactive ionic liquid of Formula (2), the cation is the first ionic component, while the anion is the second ionic component. In the reactive ionic liquid of Formula (3), the cation is the second ionic component, while the anion is the first ionic component.

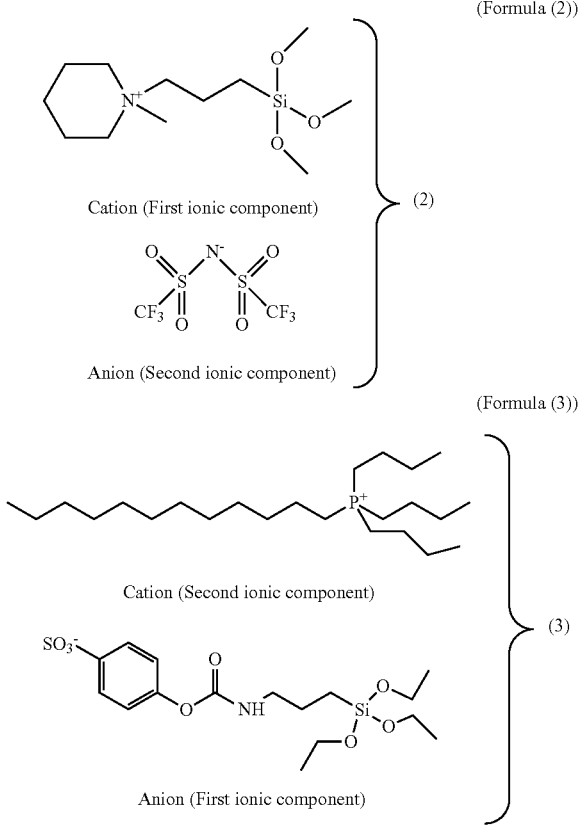

Figure 5:
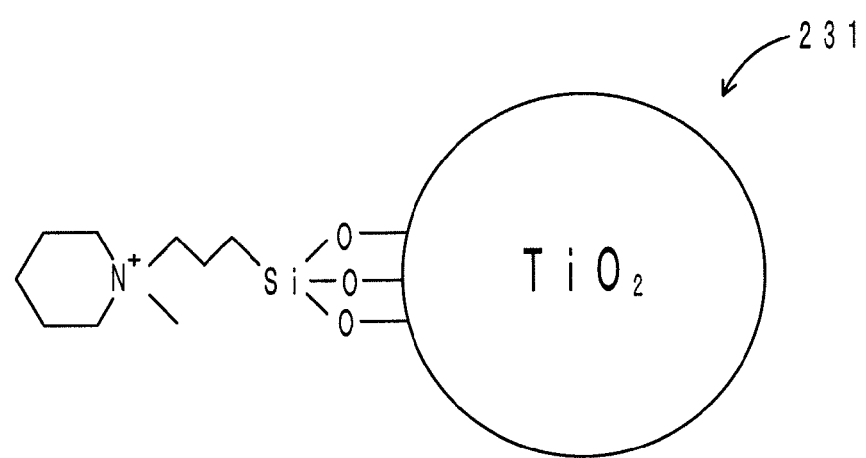
FIG. 5 is a schematic view of produced cation-immobilized particles.

For example, in the present process, when titanium dioxide (TiO$_2$) is produced as the metallic oxide particles, cation-immobilized particles in which cations are immobilized to TiO$_2$ are produced upon reaction of TiO$_2$ with the reactive ionic liquid of Formula (2). A schematic view of the cation-immobilized particles produced in this case is illustrated in FIG. 5 (see FIG. 3 for the reference numeral). In the cation-immobilized particles 231, the cations (the first ionic components) may be chemically bonded to the surface of TiO$_2$ (the metallic oxide particles) or may be chemically bonded to the inside thereof.

For the organic solvent, alcohols such as methanol, ethanol, and isopropyl alcohol (IPA), ketones such as methyl ethyl ketone (MEK) and methyl isobutyl ketone (MIBK), and ethers such as tetrahydrofuran (THF) may be used. For example, addition of IPA improves the affinity between the chelate compound and water, so that nuclei of metallic oxide particles are more likely to be produced. Addition of MEK can improve the compatibility between the sol containing ion-immobilized particles and a solution dissolving a pre-crosslinked polymer of the elastomer when the medium-resistance layer is manufactured. Depending on the type and additive amount of an organic solvent used, the particle diameter of the metallic oxide particles to be produced varies. For example, when metallic oxide particles having a median diameter of about 10 nm to 20 nm are produced, IPA and MEK may be added with the number of moles of IPA/the number of moles of MEK being about 0.6, and the additive amount of IPA may be seven to ten times the number of moles of the used organometallic compound. Water may be added in an amount required for the hydrolysis of the organometallic compound.

As described above, through the chelating process and the ion immobilizing process, the sol containing the ion-immobilized particles and the second ionic components is obtained. The obtained sol may be used for the manufacture of the medium-resistance layer as it is. However, the obtained sol is preferably used for the manufacture of the medium-resistance layer after subjected to aging treatment. The aging treatment may be performed by leaving the sol at rest for a few hours under a temperature of about 40° C. The aging treatment can reduce the number of hydroxy groups remaining within the metallic oxide particles. Therefore, the agglomeration of the ion-immobilized particles in the sol under storage can be suppressed.

The medium-resistance layer containing the ion-immobilized particles is produced by forming a mixed solution containing the sol containing the ion-immobilized particles and the second ionic components and the solution dissolving the pre-crosslinked polymer of the elastomer into a film. Specifically, the mixed solution is applied onto a substrate (may also be a high-resistance layer), and the obtained coated film is heated to be cross-linked, thereby forming the medium-resistance layer. The mixed solution may be blended with a crosslinking agent or the like as needed. At the time of cross-linking, the hydroxy groups on the surfaces of the ion-immobilized particles react with the functional groups of the elastomer, thereby allowing the ion-immobilized particles to be chemically bonded to the elastomer.

In the medium-resistance layer, the content of the ion-immobilized particles is preferably 1 part by mass or more and 10 parts by mass or more with respect to 100 parts by mass of the elastomer. When the content of the ion-immobilized particles is less than 1 part by mass, the effect of increasing an electrostatic attraction is poor. In contrast, when the content of the ion-immobilized particles exceeds 10 parts by mass, the effect of increasing the electrostatic attraction is saturated, making the amount of what is called leakage current larger.

<Electrodes>

In the transducer according to the present invention, the pair of electrodes includes a binder and a conductive material. The binder may be resin or an elastomer. In view of forming electrodes whose electric resistance is less likely to increase even when they expand and contract, the binder is preferably an elastomer. Examples of the elastomer include cross-linked rubber such as silicone rubber, NBR, EPDM, natural rubber, styrene-butadiene rubber (SBR), acrylic rubber, urethane rubber, epichlorohydrin rubber, chlorosulfonated polyethylene, and chlorinated polyethylene and thermoplastic elastomers that are based on styrene, olefin, vinyl chloride, polyester, polyurethane, polyamide, or the like. Elastomers modified by, for example, introducing functional groups, such as epoxy-group modified acrylic rubber and carboxy group-modified hydrogenated nitrile rubber, may also be used.

The type of the conductive material is not in particularly limited. The conductive material may be appropriately selected from conductive carbon powders of carbon black, carbon nano tubes, graphite, and the like, metallic powders of silver, gold, copper, nickel, rhodium, palladium, chromium, titanium, platinum, iron, the alloys of these, and the like. A powder made of particles covered with metal, such as a silvered copper powder, may also be used. The above materials may be used singly or in combination of two or more of them.

For example, when the particles covered with metal are particles other than metal, the specific gravity of the conductive material can be reduced compared to a case where the particles are made of only metal. When the particles are made into a coating, therefore, settling of the conductive material is suppressed, leading to improved dispersibility. By processing the particles, conductive materials having various shapes can be manufactured easily, and the cost of the conductive material can be reduced. The metal for use in covering, metallic materials listed above, such as silver, may be used. Examples of the particles other than metal include carbon materials such as carbon black, metal oxides such as calcium carbonate, titanium dioxide, aluminum oxide, and barium titanate, inorganic substances such as silica, and resin such as acryl and urethane.

The electrode may contain, in addition to the binder and the conductive material, additives such as dispersing agents, reinforcing agents, plasticizers, antioxidants, and colorants as needed. For example, when an elastomer is used as the binder, the conductive material and, as needed, the additive are added to a polymer solution in which a polymer for the elastomer content is dissolved in a solvent, and the solution is stirred and mixed, so that a conductive coating can be prepared. The electrode may be formed by directly applying the prepared conductive coating onto one side of the high-resistance layer or of the medium-resistance layer. Alternatively, the electrode may be formed by applying the conductive coating onto a mold release film, and the formed electrode may be transferred to one side of the high-resistance layer or of the medium-resistance layer.

For a method for applying the conductive coating, various known method can be employed. Examples of the method include printing methods such as inkjet printing, flexographic printing, gravure printing, screen printing, pad printing, and lithography, the dip method, the spray method, and the bar-coating method. For example, when the printing methods are employed, selective coating for a part to be coated and a part not to be coated can be performed easily. Printing in a large area, a thin line, and a complicated shape can also be performed easily. Among the printing methods, the screen printing method is preferable for the reason that a high-viscosity coating can be used and that the thickness of the coated film can be adjusted easily.

<Method for Manufacturing Transducer>

A transducer according to the present invention can be manufactured as follows. In a first manufacturing method, the high-resistance layer and the medium-resistance layer are manufactured separately. Subsequently, the high-resistance layer and the medium-resistance layer are laminated together to manufacture a stacked body. Finally, the electrodes may be provided on both the front side and the back side of the stacked body.

In a second method, for each of the high-resistance layer and the medium-resistance layer, an elastomer composition containing predetermined raw materials is prepared. Subsequently, the elastomer composition for the high-resistance layer and the elastomer composition for the medium-resistance layer are stacked in a mold, and pressed to be crosslinked to manufacture a stacked body. Finally, the electrodes may be provided on both the front side and the back side of the stacked body.

In a third method, the high-resistance layer is formed by applying a solution in which raw materials such as the pre-crosslinked polymer of the elastomer is dissolved in a predetermined solvent onto a substrate and heating the coated film to be crosslinked. Subsequently, the medium-resistance layer is formed by applying a liquid raw material for forming the medium-resistance layer on a substrate and heating the coated film to be crosslinked. The formed high-resistance layer and medium-resistance layer are laminated together, and the substrates are removed to manufacture a stacked body. Finally, the electrodes may be formed on both the front side and the back side of the stacked body.

As the above third embodiment, when the medium-resistance layer contains ionic components immobilized to a polymer, a voltage is applied so that the polarity of the electrode and the electric charges of the ionic components immobilized within the medium-resistance layer adjacent to the electrode become the same.

EXAMPLES

Subsequently, the present invention will be described more specifically with reference to the examples.

<Manufacture of Actuator>

[High-Resistance Layer]

A high-resistance layer was produced as described below. First, 100 parts by mass of carboxy group-modified hydrogenated nitrile rubber ("Therban (trademark) XT8889" manufactured by LANXESS) and 10 parts by mass of silica ("Aerosil (trademark) 380" manufactured by Nippon Aerosil Co., Ltd.) were mixed and kneaded by a roll mill. Subsequently, the kneaded material was dissolved in acetylacetone. Then, 15 parts by mass of tetrakis(2-ethylhexyloxy) titanium as an organometallic compound was added to this solution to prepare a liquid elastomer composition. The solid content concentration of the prepared elastomer composition was 12% by mass. The acetylacetone here serves as a solvent for dissolving the carboxy group-modified hydrogenated nitrile rubber and also serves as a chelating agent for tetrakis(2-ethylhexyloxy) titanium. Then, the elastomer composition was applied onto a substrate and dried, and then, heated at 150° C. for about 60 minutes to obtain the high-resistance layer. Three high-resistance layers having different film thicknesses were produced. The thicknesses were 36 μm, 18 μm, and 9 μm. The volume resistivity of the high-resistance layers was $2 \times 10^{14}$ Ω·m.

[Medium-Resistance Layer]

(1) Medium-resistance Layer Containing No Ionic Component

As one medium-resistance layer, a non-ion-containing layer that contains no ionic component was produced. The non-ion-containing layer was produced in the same manner as the above high-resistance layer except that silica was not blended and that the additive amount of tetrakis(2-ethylhexyloxy) titanium as the organometallic compound was changed to be 5 parts by mass. The volume resistivity of the produced non-ion-containing layer was $2 \times 10^{12}$ Ω·cm.

(2) Cation-immobilized Layer

As one medium-resistance layer, a cation-immobilized layer was produced as described below. First, 0.02 mol of acetylacetone was added to 0.01 mol of tetra-i-propoxy titanium as an organometallic compound to be chelated. Subsequently, 0.002 mol of the reactive ionic liquid of Formula (2), 5 ml (0.083 mol) of isopropyl alcohol (IPA), 10 ml (0.139 mol) of methyl ethyl ketone (MEK), and 0.04 mol of water were added to the obtained chelate compound to obtain a sol containing $TiO_2$ particles to which cations are immobilized (cation-immobilized particles) and anions. The obtained sol was left at rest for two hours under a temperature of 40° C. to perform aging treatment. The median diameter of the $TiO_2$ particles within the sol was 8 nm.

Subsequently, 20 parts by mass of the sol after aging and 100 parts by mass of an acetylacetone solution of carboxy group-modified hydrogenated nitrile rubber (containing silica) that was used for the production of the high-resistance layer were mixed, and 3 parts by mass of an acetylacetone solution of tetrakis(2-ethylhexyloxy) titanium (a concentration of 20% by mass) as a crosslinking agent was further added thereto to prepare a mixed solution. The prepared mixed solution was applied onto a substrate and dried, and then, heated at 150° C. for about 60 minutes to obtain the cation-immobilized layer. The content of the cation-immobilized particles in the cation-immobilized layer was 6.6 parts by mass. Two cation-immobilized layers having different film thicknesses were produced. One of the layers had a film thickness of 18 μm and the other had a film thickness of 9 μm. The volume resistivity of the cation-immobilized layer was $9\times10^{11}$ Ω·cm.

(3) Anion-immobilized Layer

As one medium-resistance layer, an anion-immobilized layer was produced. The anion-immobilized layer was produced in the same manner as the above cation-immobilized layer except that the type of the reactive ionic liquid was changed to that of Formula (3). A sol obtained in the production process contains $TiO_2$ particles to which anions are immobilized (anion-immobilized particles) and cations. The volume resistivity of the anion-immobilized layer was $2\times10^{11}$ Ω·cm.

Actuator of Example 1

The cation-immobilized layer (a film thickness of 9 μm) was bonded onto the high-resistance layer (a film thickness of 9 μm) removed from the substrate so as to cover the front side of the high-resistance layer, while the anion-immobilized layer (a film thickness of 9 μm) was bonded to the high-resistance layer so as to cover the back side of the high-resistance layer. Then, the substrates were removed from both the cation-immobilized layer and the anion-immobilized layer to produce a three-layer stacked body. Carbon black was mixed into an acrylic rubber polymer solution and dispersed therein to prepare a conductive coating. The conductive coating was screen-printed onto both the front side and the back side of the produced three-layer stacked body to form electrodes. The actuator of Example 1 was thus manufactured. The thickness ratio of the high-resistance layer in the actuator of Example 1 is 0.33. The actuator of Example 1 is included in the transducer according to the present invention.

Actuator of Example 2

An actuator of Example 2 was manufactured in the same manner as Example 1 except that the film thickness of the high-resistance layer was changed to be 18 μm. The thickness ratio of the high-resistance layer in the actuator of Example 2 is 0.5. The actuator of Example 2 is included in the transducer according to the present invention.

Actuator of Example 3

A two-layer stacked body was manufactured by bonding a cation-immobilized layer (18 μm) onto only the front side of the high-resistance layer (a film thickness of 18 μm) removed from the substrate and removing the substrate from the cation-immobilized layer. The same conductive coating as in Example 1 was screen-printed onto both the front side and the back side of the produced two-layer stacked body to provide electrodes. The actuator of Example 3 was thus manufactured. The thickness ratio of the high-resistance layer in the actuator of Example 3 is 0.5. The actuator of Example 3 is included in the transducer according to the present invention.

Actuator of Example 4

An actuator of Example 4 was manufactured in the same manner as Example 3 except that the film thicknesses of both the high-resistance layer and the cation-immobilized layer were changed to be 9 μm. The thickness ratio of the high-resistance layer in the actuator of Example 4 is 0.5. The actuator of Example 4 is included in the transducer according to the present invention.

Actuator of Example 5

A three-layer stacked body was manufactured by bonding the non-ion-containing layer (a film thickness of 9 μm) onto the high-resistance layer (a film thickness of 9 μm) removed from the substrate so as to cover both the front side and the back side of the high-resistance layer and removing the substrate from the non-ion-containing layer. The same conductive coating as in Example 1 was screen-printed onto both the front side and the back side of the produced three-layer stacked body to form electrodes. The actuator of Example 5 is thus manufactured. The thickness ratio of the high-resistance layer in the actuator of Example 5 is 0.33. The actuator of Example 5 is included in the transducer according to the present invention.

Actuator of Comparative Example 1

An actuator was manufactured without using the medium-resistance layer. More specifically, the same conductive coating as in Example 1 was directly screen-printed onto both the front side and the back side of the high-resistance layer (a film thickness of 36 μm) to form electrodes. The actuator of Comparative Example 1 is thus manufactured.

Actuator of Comparative Example 2

An actuator of Comparative Example 2 was manufactured in the same manner as Comparative Example 1 except that the film thickness of the high-resistance layer was changed to be 9 μm.

Table 1 illustrates the structures of the stacked bodies in the manufactured actuators (a single layer formed of only the high-resistance layer in Comparative Examples 1 and 2).

TABLE 1

| | | Example 1 | Example 2 | Example 3 | Example 4 | Example 5 | Comparative Example 1 | Comparative Example 2 |
|---|---|---|---|---|---|---|---|---|
| Structure of stacked | Front-side medium-resistance layer | 9 μm (Cation-immobilized) | 9 μm (Cation-immobilized) | 18 μm (Cation-immobilized) | 9 μm (Cation-immobilized) | 9 μm | — | — |

TABLE 1-continued

|  |  | Example 1 | Example 2 | Example 3 | Example 4 | Example 5 | Comparative Example 1 | Comparative Example 2 |
|---|---|---|---|---|---|---|---|---|
| body | High-resistance layer | 9 µm | 18 µm | 18 µm | 9 µm | 9 µm | 36 µm | 9 µm |
|  | Back-side medium-resistance layer | 9 µm (Anion-immobilized) | 9 µm (Anion-immobilized) | — | — | 9 µm | — | — |

<Evaluation of Actuators>

[Measurement of Dielectric Breakdown Strength]

Figure 6:
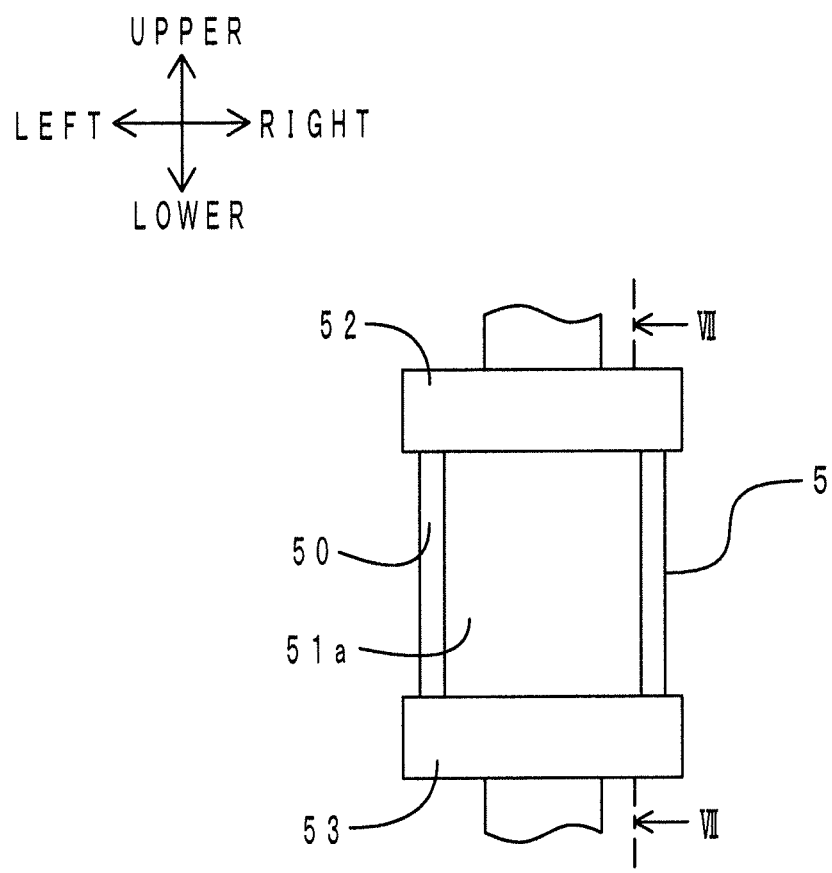
FIG. 6 is a front-side elevation view of an actuator mounted on a measuring apparatus.
Figure 7:
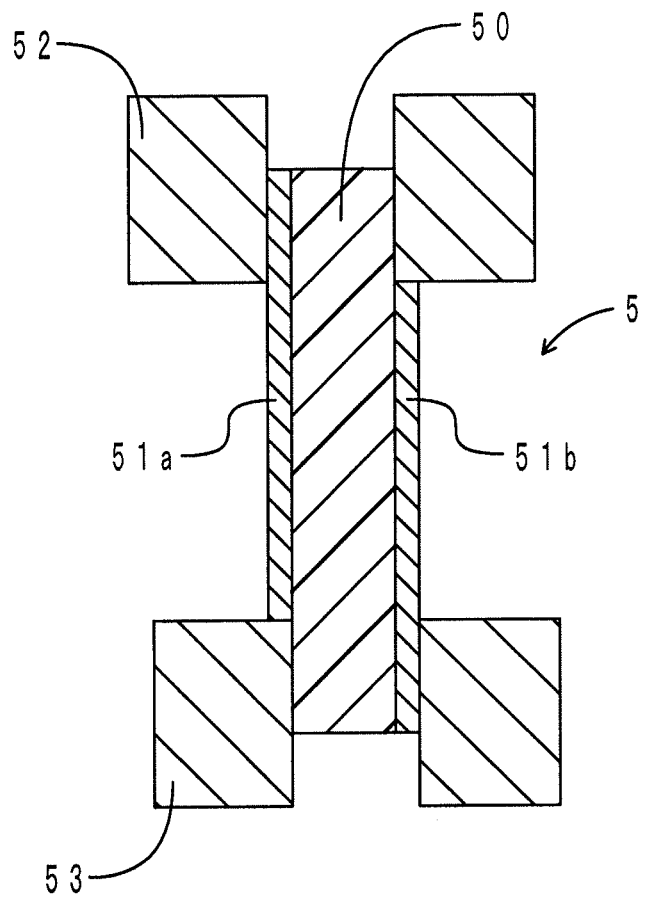
FIG. 7 is a VII-VII sectional view of FIG. 6.

The dielectric breakdown strengths of the actuators of Examples 1 to 3 and Comparative Example 1 were measured. First, a measuring apparatus and a measuring method will be described. FIG. 6 illustrates a front-side elevation view of an actuator mounted on the measuring apparatus. FIG. 7 illustrates a VII-VII sectional view of FIG. 6.

As illustrated in FIG. 6 and FIG. 7, the upper end of an actuator 5 is held by an upper chuck 52 of the measuring apparatus. The lower end of the actuator 5 is held by a lower chuck 53. The actuator 5 is arranged between the upper chuck 52 and the lower chuck 53 while being extended in advance in the up and down direction (with an elongation ratio of 25%). A load cell (not shown) is arranged over the upper chuck 52.

The actuator 5 includes a stacked body (a single layer formed of only the high-resistance layer in Comparative Example 1) 50 and a pair of electrodes 51a, 51b. The stacked body 50 has a rectangular plate shape that is 50 mm long and 25 mm wide in a natural state. The structure of the stacked body 50 varies among the actuators (see Table 1). The electrodes 51a, 51b are arranged so as to face each other in the front and back direction across the stacked body 50. Each of the electrodes 51a, 51b has a rectangular plate shape that is 40 mm long, 25 mm wide, and about 10 µm thick in a natural state. The electrodes 51a, 51b are arranged so as to be displaced from each other by 10 mm in the up and down direction. In other words, the electrodes 51a, 51b overlap, via the stacked body 50, in a range of 30 mm long and 25 mm wide. An electric wire (not shown) is connected to the lower end of the electrode 51a. Similarly an electric wire (not shown) is connected to the upper end of the electrode 51b. The electrodes 51a, 51b are connected to a power source (not shown) through the respective electric wires. During voltage application, the front-side electrode 51a is the positive pole, while the back-side electrode 51b is the negative pole.

Figure 8:
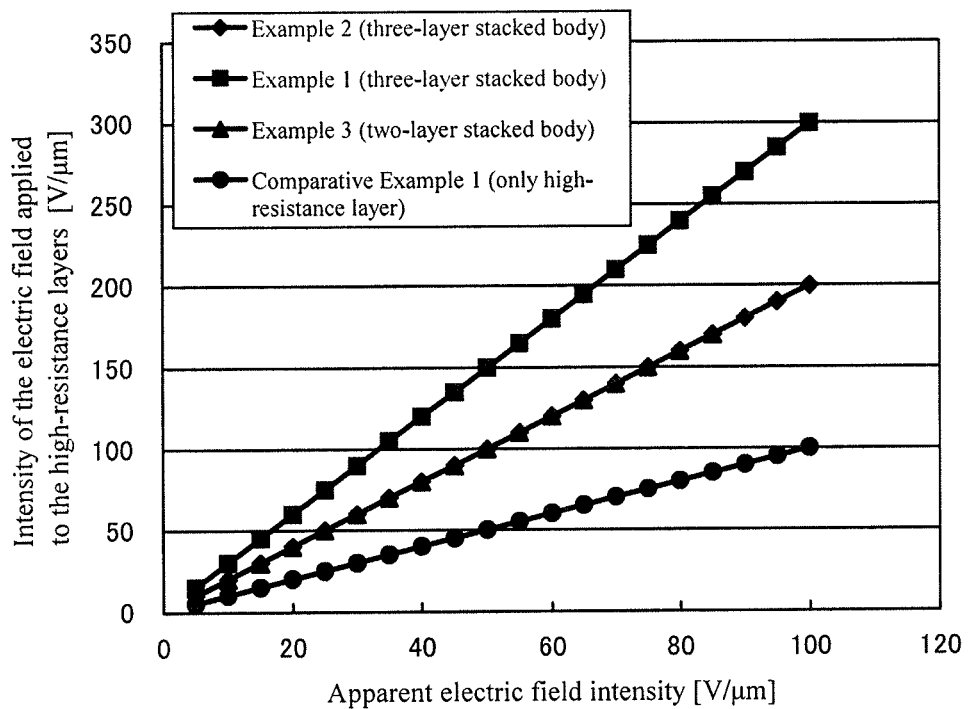
FIG. 8 is a graph illustrating the relationship between the apparent electric field intensity and the intensity of the electric field applied to a high-resistance layer in the actuators according to Examples 1 to 3 and Comparative Example 1.

The measurement of dielectric breakdown strength was performed by increasing stepwise a voltage applied between the electrodes 51a, 51b until the stacked body 50 was broken. A value obtained by dividing the applied voltage by the entire thickness of the stacked body 50 was considered as apparent electric field intensity. A voltage applied to the high-resistance layer was calculated from Formula (1), and a value obtained by dividing the voltage by the thickness of the high-resistance layer was considered as an intensity of electric field applied to the high-resistance layer. FIG. 8 illustrates the relationship between the apparent electric field intensity and the intensity of the electric field applied to the high-resistance layers in the actuators of Examples 1 to 3 and Comparative Example 1.

As illustrated in FIG. 8, in the actuator of Comparative Example 1, dielectric breakdown occurred at an apparent electric field intensity of 100 V/µm. The actuator of Comparative Example 1 does not include the medium-resistance layer, so the apparent electric field intensity and the intensity of electric field applied to the high-resistance layer match. In contrast, the actuators of Examples 1 to 3 include the medium-resistance layers. Therefore, even when the apparent electric field intensity is 100 V/µm, the intensity of the electric field actually applied to the high-resistance layer is larger than the apparent electric field intensity. In the actuator of Example 1, dielectric breakdown did not occur until the intensity of the electric field applied to the high-resistance layer reached 300 V/µm. In the actuator of Example 3, dielectric breakdown did not occur until the intensity of the electric field applied to the high-resistance layer reached 170 V/µm.

It has been thus confirmed that by interposing the medium-resistance layer between the electrode and the high-resistance layer, the resistance to dielectric breakdown that is originally possessed by the high-resistance layer can be exhibited and as a result, the resistance to dielectric breakdown of the actuator is improved.

[Measurement of Generative Force]

Figure 9:
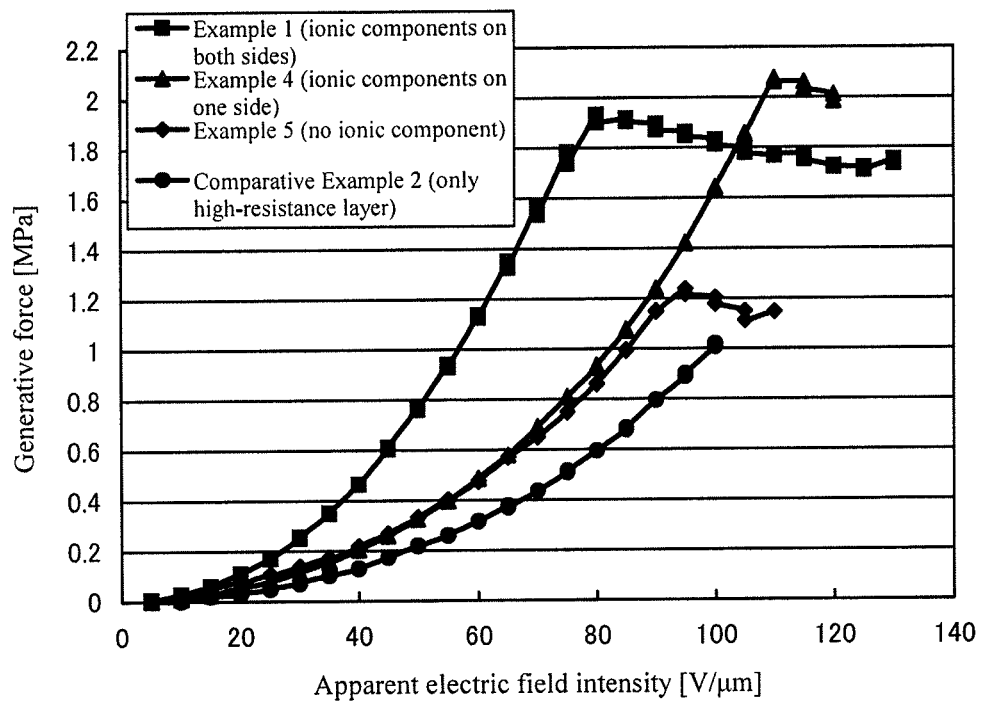
FIG. 9 is a graph illustrating the relationship between the apparent electric field intensity and the generative force according to Examples 1, 4, and 5 and Comparative Example 2.

For the actuators of Examples 1, 4, and 5 and Comparative Example 2, a generative force with respect to an applied voltage was measured. The measurement of the generative force was performed using the same apparatus as in the measurement of dielectric breakdown strength (see FIG. 6 and FIG. 7). When a voltage is applied between the electrodes 51a, 51b, an electrostatic attraction occurs between the electrodes 51a, 51b to compress the stacked body 50 (a single layer formed of only the high-resistance layer in Comparative Example 2). The stacked body 50 thereby decreases in thickness and expands in the extension direction (the up and down direction). Through the expansion of the stacked body 50, the extension force in the up and down direction decreases. A decrease in the extension force with voltage application was measured using the load cell and was regarded as a generative force. The measurement of the generative force was performed by increasing stepwise the applied voltage until the stacked body 50 was broken. FIG. 9 illustrates the relationship between the apparent electric field intensity and the generative force in the actuators of Examples 1, 4, and 5 and Comparative Example 2.

As illustrated in FIG. 9, when compared at the same electric field intensity, the actuators of Examples 1, 4, and 5 gave a larger generative force than the actuator of Comparative Example 2. The actuators of Examples 1, 4, and 5 gave a higher applicable voltage. In particular, the actuators of Examples 1 and 4, which include the medium-resistance layer containing the ionic components, gave a larger generative force. In more particular, the actuator of Example 1 having the three-layer structure gave a larger generative force even with small electric field intensity.

It has been thus confirmed that by interposing the medium-resistance layer between the electrode and the high-resistance layer, a larger force can be obtained. It has also been confirmed that when the medium-resistance layer contains the ionic components, the generative force further increases.

INDUSTRIAL APPLICABILITY

The transducer according to the present invention can be widely used for an actuator, a sensor, and the like that perform conversion between mechanical energy and electric energy and a speaker, a microphone, a noise canceller, and the like that perform conversion between acoustic energy and electric energy. In particular, the transducer is suitable for a flexible actuator that is used in: an artificial muscle for use in industrial, medical and welfare robots, power-assisted suits, and the like; a small-sized pump for use in cooling electronic components, for medical use, and the like; and medical instruments and the like.

The invention claimed is:

1. A transducer, comprising:
   a high-resistance layer that includes an elastomer and has a volume resistivity of $10^{12}$ Ω·cm or more;
   a pair of electrodes that are arranged on both a front side and a back side of the high-resistance layer and include a binder and a conductive material; and
   a medium-resistance layer that is interposed between one of the electrodes and the high-resistance layer on at least one of the front side and the back side of the high-resistance layer, has a volume resistivity that is smaller than the volume resistivity of the high-resistance layer by two or more digits,
   wherein the medium-resistance layer includes: an elastomer, ion-immobilized particles in which first ionic components are immobilized to metallic oxide particles, and second ionic components having electric charges opposite to electric charges of the first ionic components,
   the ion-immobilized particles are chemically bonded to the elastomer, and the polarity of the electric charges of the first ionic components is same as the polarity of the electrode adjacently provided.

2. The transducer according to claim 1, wherein the medium-resistance layer is arranged on both the front side and the back side of the high-resistance layer.

3. The transducer according to claim 1, wherein the thickness ratio of the high-resistance layer with respect to the entire thickness of the high-resistance layer and the medium-resistance layer is 0.1 or more and 0.75 or less.

4. The transducer according to claim 1, wherein the thickness of the high-resistance layer is between 5 μm and 50 μm.

5. The transducer according to claim 1 wherein the median diameter of the metallic oxide particles is between 5 nm and 100 nm.

6. The transducer according to claim 1, wherein the ion-immobilized particles are synthesized by causing a reactive ionic liquid containing the first ionic components before immobilization and the second ionic components to react with the metallic oxide particles obtained by hydrolytic reaction of an organometallic compound.

7. The transducer according to claim 6, wherein the first ionic components contained in the reactive ionic liquid include an alkoxysilyl group, and the first ionic components are immobilized by reaction between the alkoxysilyl group and a hydroxy group of the metallic oxide particles.

8. The transducer according to claim 1, wherein the ion-immobilized particles include a hydroxy group, and the elastomer in the medium-resistance layer includes one or more functional groups selected from a carboxy group, an amino group and an epoxy group.

9. The transducer according to claim 1, wherein the metallic oxide particles contain one or more elements selected from titanium, zirconium, and silicon.

10. The transducer according to claim 1, wherein the content of the ion-immobilized particles in the medium-resistance layer is between 1 part by mass and 10 parts by mass with respect to 100 parts by mass of the elastomer.

\* \* \* \* \*